UNITED STATES PATENT OFFICE.

JOHN T. RICHARDS, OF GARDINER, MAINE.

COMPOSITION FOR JOURNAL-BEARINGS.

SPECIFICATION forming part of Letters Patent No. 492,750, dated February 28, 1893.

Application filed July 21, 1892. Serial No. 440,795. (No specimens.)

*To all whom it may concern:*

Be it known that I, JOHN T. RICHARDS, a citizen of the United States, residing at Gardiner, in the county of Kennebec and State of Maine, have invented an Improved Anti-Friction Composition for Journal-Bearings, Axle-Boxes, &c.; and I hereby declare the following to be a full, clear, and exact description thereof.

My invention relates to an improved anti-friction composite substance for axle-boxes, linings of the same, journal-bearings &c., made from certain ingredients combined and molded, and hardened as hereinafter set forth.

In carrying my invention into effect, I take by weight four parts of pulverized plumbago, four parts of dry white lead, four parts of litharge, and two parts of any suitable fibrous substance, preferably asbestus, place them in a suitable receptacle, and thoroughly mix and incorporate them together by grinding, kneading, or in any other suitable manner, adding thereto while being mixed, as a cementing or binding substance, a drying oil, preferably boiled linseed oil, to bring the mixture to such a consistency that it can be readily molded into any desired form or shape. In some cases when it is desired to increase the hardness of the composition, I dissolve or digest in the linseed oil a small quantity of resin or gum copal. After the ingredients have been thoroughly commingled and the mass brought to a plastic condition as above described, the composition is placed in a mold and submitted to pressure for the purpose of giving it the desired shape and density to adapt it for the use for which it is intended. It is sometimes necessary to submit the article to a second pressure to perfect its shape, increase its density, and cause it to more accurately fit the space or chamber in which it is to be used; and especially may this be necessary in making axle-boxes with a metal shell and a lining of this lubricating material or composition, as after the lining of the lubricating material is inserted in a metal axle-box it must be pressed into place and given thereby its proper density. After being molded, dried, and compressed, the composition may be further hardened by continued drying in the air, or it may be subjected to a baking and hardening process in a retort, or in an open or closed oven, whereby it is still further hardened and solidified, and rendered capable of resisting the heavy pressure and wear to which it may be subjected.

The article molded as above described can be fitted by proper tools to any space which it is to occupy.

I do not wish to limit myself to the exact proportions or ingredients as above described, as they may be varied to some extent without departing from the spirit of my invention.

The above described composition of matter, on account of its durability and self-lubricating qualities, is especially adapted for axle-boxes, linings of the same, packings, and journal bearings, and for other articles wherever there may be frictional contact between two parts.

What I claim as my invention, and desire to secure by Letters Patent, is—

1. The herein-described composition of matter for bearings &c., comprising plumbago, white lead, litharge, a fibrous substance, and a binding or cementing substance consisting of a drying-oil in about the proportions substantially as specified.

2. A composition of matter for bearings &c., comprising plumbago, white-lead, litharge, asbestus, and linseed oil, in about the proportions substantially as specified.

3. A composition of matter for bearings &c., comprising plumbago, white lead, litharge, and a fibrous substance in substantially the proportions named, and a binding or cementing substance consisting of resin or gum-copal dissolved or digested in linseed oil, substantially as described.

4. A composition of matter for bearings &c., comprising plumbago, white lead, litharge, asbestus, and a binding or cementing substance consisting of resin or gum-copal dissolved or digested in linseed oil, all combined in about the proportions substantially as specified.

5. A molded or hardened composition for bearings &c., the same comprising plumbago, white lead, litharge, and asbestus, substantially in the proportions named, and a binding or cementing substance, substantially as set forth.

Witness my hand this 13th day of July, A. D. 1892.

JOHN T. RICHARDS.

In presence of—
GEO. W. HESELTON,
A. E. HARMON.